United States Patent [19]

Nakamoto et al.

[11] Patent Number: 4,970,183
[45] Date of Patent: Nov. 13, 1990

[54] HYDROCARBON OIL CATALYTIC CRACKING CATALYST COMPOSITIONS

[75] Inventors: Hiromi Nakamoto; Tatsuo Masuda; Kouichi Ohama; Katsuhiro Shirono; Masamitsu Ogata, all of Kitakyushu; Yoichi Nishimura, Yokohama, all of Japan

[73] Assignee: Catalysts & Chemicals Industries Co., Ltd., Tokyo, Japan

[21] Appl. No.: 152,657

[22] Filed: Feb. 5, 1988

[30] Foreign Application Priority Data

Feb. 13, 1987 [JP] Japan .................................. 62-29526

[51] Int. Cl.$^5$ ...................... B01J 29/08; B01J 21/16; B01J 27/82
[52] U.S. Cl. ......................................... 502/68; 502/64; 502/79; 502/214
[58] Field of Search ..................... 502/64, 68, 79, 214; 208/114

[56] References Cited

U.S. PATENT DOCUMENTS

| 4,430,199 | 2/1984 | Durante et al. | 208/114 |
| 4,454,241 | 6/1984 | Pine et al. | 502/214 |
| 4,456,780 | 6/1984 | Young | 585/475 |
| 4,567,152 | 1/1986 | Pine | 502/64 |
| 4,584,091 | 4/1986 | Pine | 502/64 |
| 4,605,637 | 8/1986 | Chang et al. | 502/214 |
| 4,650,783 | 3/1987 | Chao et al. | 502/214 |
| 4,692,236 | 9/1987 | Sato et al. | 208/114 |
| 4,839,319 | 6/1989 | Schuette et al. | 502/64 |

Primary Examiner—Carl F. Dees
Attorney, Agent, or Firm—Flynn, Thiel, Boutell & Tanis

[57] ABSTRACT

The composition obtained by mixing a Y faujasite, having a phosphorus component into a water suspension of precursor of a porous matrix, and spray-drying said mixture, is a heavy hydrocarbon catalytic cracking catalyst which produces gasoline in high yield and is superior in thermally stability.

9 Claims, 1 Drawing Sheet

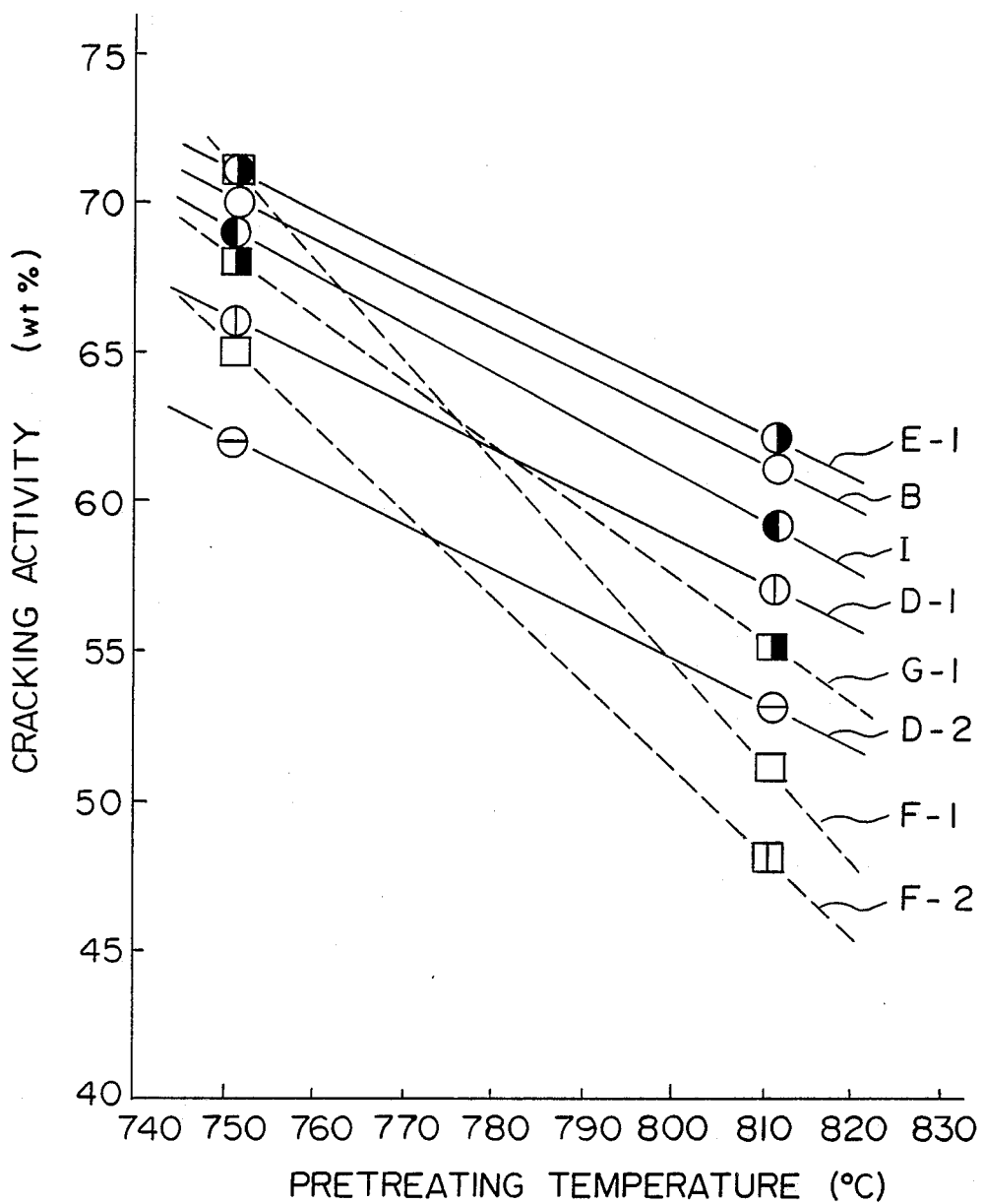

HYDROCARBON OIL CATALYTIC CRACKING CATALYST COMPOSITIONS

BACKGROUND OF THE INVENTION

The present invention relates to hydrocarbon oil catalytic cracking catalyst compositions and, in more specifically, relates to catalyst compositions which display a high cracking activity when used in the catalytic cracking of hydrocarbon oils, but produce lower amounts of coke and impart superior thermally stability despite said high cracking activity.

As the original object of hydrocarbon catalytic cracking consists in the production of gasoline, it is natural that the catalyst used should be high in catalytic activity and gasoline selectivity. But, there has usually been a common evil in that a catalyst being high in catalytic activity produces a large quantity of coke.

In recent years, however, crude oil supply circumstances have changed to bring about the situation where low grade heavy hydrocarbon fractions containing heavy metals such as vanadium, nickel, iron, copper and the like, typically residual oils, must be used as catalytic cracking materials. In the case of catalytic cracking low grade heavy hydrocarbons, however, as the degree of metallic contaminants contained in feed stock being deposited on the catalyst is heightened, the cracking activity of the catalyst is destroyed by this extraordinary deposition of metals.

In addition, said catalytic cracking is disadvantageous in that the metals deposited on the catalyst accelerate the dehydrogenating reaction and thus promote the production of hydrogen and coke.

As catalytic compositions which display a high cracking activity when used in the catalytic cracking of hydrocarbons but produce low amounts of hydrogen and coke, there is, for instance, Japanese Laid-open patent application No. 177138/1984 which discloses catalytic compounds which comprise combinations of silica and stabilized Y zeolite. Japanese Published patent application No. 5748/1972 teaches catalytic compositions which comprise dispersed crystalline zeolite particles in phosphate solution-treated silica-magnesia.

Japanese Laid-open patent application No. 214344/1983 further discloses that a catalytic composition, containing the hydrogen type faujasite Y prepared by the use of clay as starting material and the residue derived from said clay (silica-alumina), is improved in catalytic activity when treated by a phosphorus compound.

The usual catalytic, cracking catalysts including the above-mentioned catalyst compositions, when contacted with hydrocarbon materials under conversion reaction conditions, unavoidably produce by-product coke. Said coke deposits on the catalyst surface. The heavier the hydrocarbon, the more the deposition of coke is increased.

Generally speaking, it is common in the catalytic cracking process that the catalyst, whose activity has been deteriorated by the deposition of coke, is regenerated to restore its activity, and thereafter recycled to the conversion region. The object of said catalyst regeneration step is to subject the coke deposited on the catalyst surface to combustion-removal. Accordingly, it is preferable that the catalytic cracking catalysts should be thermally stable to such an extent that their catalytic performance may not be thermally destroyed even when exposed repeatedly to high temperatures under the steam atmosphere of the regeneration step. However, the fact is that the usual catalytic cracking catalysts are not always possessed of sufficient thermally stability.

SUMMARY OF THE INVENTION

The present invention provides a catalytic cracking catalyst composition which can produce gasoline in high yield by restraining the by-product of coke and hydrogen even when using a low grade, heavy hydrocarbon as feed stock, and moreover is superior in thermal stability.

The catalyst composition according to the present invention is prepared through the steps of treating a Y faujasite with a phosphoric ion-containing aqueous solution to make a phosphorus-containing Y faujasite (the phosphorus content: 0.3–15 wt. % as $P_2O_5$); mixing said phosphorus-containing Y faujasite with a water suspension of a precursor of a porous matrix; spray-drying said water mixture, and washing and drying the spray-dried particles.

DESCRIPTION OF THE DRAWING

FIG. 1 is a graph showing the relationship between the pretreating temperatures of the catalysts and their cracking activity.

DESCRIPTION OF THE INVENTION

As the Y faujasite of the present invention, there may be used any type of Y faujasite such as NaY, RE—Y, $NH_4$—Y, H—Y or the like. An ultrastable Y faujasite is also included therein. In the case where any type of faujasite is used, however, it is preferable that said faujasite is high in crystallinity, in other words, it is preferable that said faujasite, if possible, does not contain silica, alumina, silica-alumina and the like which remain in an amorphous phase. It is desirable that the Y faujasite used in the present invention should have a crystallinity of 80 or more, preferably 90 or more.

The crystallinity of Y faujasite can be calculated according to the following formula from the comparison of the total peak area S of h k l (533) and (642) of the X-ray diffraction obtained by a standard X-ray powder method ($CuK\alpha$) with the total peak area So of control sample obtained in the same manner:

Crystallinity (%)=100S/So wherein, as said control sample, there is used commercially available sodium-Y faujasite (SK-40 produced by Linde Division of Union Carbide Corporation), ammonium-Y faujasite or hydrogen-Y faujasite (both LZ-Y82 produced by the above Corporation).

A phosphoric ion-containing aqueous solution used for making Y faujasite containing phosphorus may be prepared in the manner of dissolving one member selected from the group consisting of phosphoric acid, diammonium hydrogen phosphate, ammonium dihydrogen phosphate and other water soluble phosphates in water. The concentration of the phosphoric ion in the aqueous solution is usually between about 0.1 and about 20 wt. %.

Incorporation of phosphorus into Y faujasite is effected by contacting the phosphoric ion-containing aqueous solution, prepared as mentioned above with Y faujasite under the pH condition of about 3 to 8 and at a room temperature up to about 100° C. The phosphorus content of the faujasite obtained by this contact is adjusted to the range of 0.3 to 15 wt. % as $P_2O_5$. When this content is less than 0.3 wt. %, it is impossible to improve the thermally stability of the catalyst and further to reduce the production of coke to a satisfactory degree. However, when the phosphorus content of the faujasite is over 15 wt. %, the cracking activity of the catalyst lowers.

When incorporating phosphorus in the Y-type faujasite, if the faujasite material is $NH_4$—Y, H—Y (including an ultrastable faujasite) and the like, it is not necessary to have an ammonium ion in the phosphoric ion-containing aqueous solution. When the faujasite material is NaY, it is preferable to use an aqueous solution in which the phosphoric ion and ammonium ion co-exist. The use of this aqueous solution makes it possible to remove the sodium contained in the faujasite by ammonium ion exchange simultaneously with the incorporation of phosphorus in the faujasite. However, even when NaY is used as the faujasite material of the present invention, so long as the sodium content in the faujasite is 3.0 wt. % or less as $Na_2O$, it is not absolutely necessary to effect said ammonium ion exchange along with the incorporation of the phosphorus. The Y faujasite containing phosphorus in the range of 0.3 to 15 wt. % as $P_2O_5$, is mixed with a water suspension of the precursor of the porous matrix, but prior thereto, may be calcined at a temperature of about 400° to 800° C. for 1 to 6 hours under the steam atmosphere. As the precursors of the porous matrices of the present invention, there can be used those of silica, silica-alumina, alumina, silica magnesia and the like, and the precursors of porous matrices employed commonly in the conventional catalytic cracking catalysts. Alumina particles, clay minerals and the like may be used in admixture with the precursors of porous matrices.

Irrespective of whether alumina particles, clay minerals and the like are mixed or not, the quantity of the phosphorus-containing faujasite to be mixed with the water suspension of the precursor of the porous matrix is maintained within the range of 5 to 50 wt. % of the final catalyst composition. The thus obtained water mixture is spray-dried in a normal manner, and the dried particles are washed. The object of said washing is to remove the alkali component from the catalyst composition of the present invention which has been spray-dried into fine globular particles. Therefore, said washing is continuously effected until the alkali content of the catalyst composition is lowered to 1.5 wt. % or less as $Na_2O$, preferably 1.0 wt. % or less. When a faujasite whose $Na_2O$ content is 3.0 wt. % or less is used as the faujasite material, washing of the spray-dried particles may be with water. When a faujasite whose $Na_2O$ content is 3.0 wt. % or more is used as the material, however, said washing is made with an ammonium ion-containing aqueous solution so that the alkali content of the catalyst composition is lowered to 1.5 wt. % or less as $Na_2O$, preferably 1.0 wt. % or less. In the catalyst of the present invention, it is also possible to first wash it and thereafter incorporate rare earth components therein in a normal manner. After completion of these steps, the catalyst of the present invention is dried as usual, and can be used in the heavy hydrocarbon catalytic cracking process.

Preparation of phosphorus-containing Y faujasite

By using water glass, silica gel, sodium aluminate, sodium hydroxide and water, there was prepared a reaction mixture having the following molar composition:

$$2.7Na_2O:Al_2O_3:8SiO_2:120H_2O$$

This reaction mixture was held at 95° C. for 48 hours, and then filtered to obtain a cake. This cake was dried at 110° C. for 16 hours to obtain NaY. It was confirmed from X-ray diffraction and chemical analysis that said NaY had a crystallinity of 110%, a unit cell constant of 24.66 Angstrom, and a $SiO_2/Al_2O_3$ mole ratio of 4.8.

(1) A part of said NaY was suspended in an aqueous solution prepared by adding phosphoric acid to an ammonium sulfate aqueous solution. The suspension was stirred at 90° C. for 0.5 hour, thereafter filtered washed, dried, and calcined at 650° C. for 3.5 hours in the air, thereby preparing a phosphorus-containing faujasite. This product is named Sample (a).

(2) A part of Sample (a) was ion-exchanged using an ammonium sulfate aqueous solution, filtered and washed to thereby prepare a phosphorus-containing faujasite whose alkali content is smaller. This product is named Sample (b).

(3) The other part of said NaY was ion-exchanged using an ammonium aqueous solution, filtered, washed, dried and calcined to thereby prepare H—Y. This product is named Sample (c).

(4) A part of Sample (c) was suspended in an aqueous solution prepared by adding phosphoric acid to an ammonium sulfate aqueous solution. The suspension was stirred at 90° C. for 0.5 hour, thereafter filtered and washed, thereby preparing a phosphorus-containing $NH_4$—Y faujasite. This product is named Sample (d).

(5) A part of Sample (d) was calcined at 700° C. for 3.5 hours in a steam atmosphere to thereby prepare a phosphorus-containing H—Y faujasite. This product is named Sample (e).

(6) A part of Sample (c) was suspended in an ammonium sulfate aqueous solution, stirred at 95° C. for 0.5 hour, thereafter filtered and washed to thereby prepare a phosphorus-free $NH_4$—Y faujasite. This product is named Sample (f).

(7) A part of Sample (f) was calcined at 680° C. for 3 5 hours in a steam atmosphere to thereby prepare a H—Y faujasite. This product is named Sample (g).

(8) The other part of Sample (f) was sintered at 800° C. for 3.5 hours in a steam atmosphere to prepare a H—Y faujasite. This product is named Sample (h).

(9) A part of Sample (g) was suspended in an ammonium dihydrogen phosphate aqueous solution, stirred at 90° C. for 0.5 hour, thereafter filtered and washed to thereby prepare a phosphorus-containing $NH_4$—Y faujasite. This product is named Sample (i).

The properties of Samples (a) to (i) prepared as mentioned above are shown collectively in Table-1.

TABLE 1

| | Properties of faujasites | | | |
|---|---|---|---|---|
| Sample | $P_2O_5$ (wt. %) | $Na_2O$ (wt. %) | Unit cell constant (Angstrom) | Crystallinity |
| a | 0.9 | 4.7 | 24.66 | 100 |
| b | 0.9 | 1.2 | 24.66 | 115 |
| c | — | 5.1 | 24.67 | 119 |
| d | 5.1 | 0.8 | 24.62 | 110 |
| e | 5.1 | 0.8 | 24.44 | 85 |
| f | — | 1.2 | 24.67 | 102 |
| g | — | 1.2 | 24.44 | 95 |
| h | — | 1.2 | 24.34 | 82 |

TABLE 1-continued

| | Properties of faujasites | | | |
|---|---|---|---|---|
| Sample | $P_2O_5$ (wt. %) | $Na_2O$ (wt. %) | Unit cell constant (Angstrom) | Crystallinity |
| i | 5.1 | 1.1 | 24.43 | 90 |

EXAMPLE 1

Commercially available water glass (JIS No.3) was diluted to prepare a water glass aqueous solution (12.73 wt. % $SiO_2$). Sulfuric acid (25 wt. % $H_2SO_4$) was separately prepared. The water glass aqueous solution and sulfuric acid were continuously mixed for 10 minutes in the ratio of 20 l/min. and 5.6 l/min. respectively, thereby preparing a silica hydrosol. A proper quantity of the thus prepared silica hydrosol (bonding agent), a proper quantity of kaolin, and a proper quantity of flash-calcined alumina particles, according to circumstances, were mixed. Then, this mixture was mixed with any one of previously prepared Samples (a) to (i), and thereafter spray-dried. The resulting dried particles were washed and dried to prepare Catalysts A to I.

In this connection, Catalysts E-2 and G-2 are catalysts which can be obtained by dipping the catalysts prepared as mentioned above in a rare earth chloride aqueous solution and thereafter washing and drying. They contain 1.8 wt. % of rare earth elements as $RE_2O_3$.

COMPARATIVE EXAMPLE 1

A phosphoric acid aqueous solution was added to a hydrogel slurry of pseudoboehmite obtained by the neutralization reaction between a sodium aluminate aqueous solution and an aluminium sulfate aqueous solution, stirred to the full, and added to kaolin and the previously obtained sample (g) respectively. This mixture was spray-dried, washed and dried to thereby obtain Catalyst V. Catalyst V was observed to comprise 30 wt. % of zeolite, 16.5 wt. % of kaolin, 45 wt. % of alumina and 8.5 wt. % of $P_2O_5$, and also contain 0.4 wt. % of $Na_2O$ therein.

COMPARATIVE EXAMPLE 2

A catalyst was prepared using Sample (g) and according to the same procedure as Example 1. This catalyst was impregnated with a diammonium hydrogen phosphate aqueous solution, and thereafter dried to thereby prepare a catalyst containing 1.5 wt. % of phosphorus as $P_2O_5$. This was named Catalyst W.

The compositions of the respective catalysts prepared according to the above mentioned example and comparative examples are shown collectively in Table-2.

TABLE 2

| | Composition of catalyst | | | | | | | | | | | | | | | | |
|---|---|---|---|---|---|---|---|---|---|---|---|---|---|---|---|---|---|
| | Catalyst No. | | | | | | | | | | | | | | | | |
| | A | B | C | D-1 | D-2 | E-1 | E-2 | E-3 | F-1 | F-2 | G-1 | G-2 | G-3 | H | I | V | W |
| Zeolite sample | a | b | c | d | d | e | e | e | f | f | g | g | g | h | i | g | g |
| Zeolite quantity (wt. %) | 40 | 40 | 40 | 30 | 20 | 40 | 7.5 | 30 | 40 | 30 | 40 | 7.5 | 30 | 40 | 40 | 30 | 30 |
| $P_2O_5$ amount in zeolite (wt. %) | 0.9 | 0.9 | — | 5.1 | 5.1 | 5.1 | 5.1 | 5.1 | — | — | — | — | — | — | 5.1 | — | — |
| Porous matrix (wt. %) | 60 | 60 | 60 | 70 | 80 | 60 | 92.5 | 70 | 60 | 70 | 60 | 92.5 | 70 | 60 | 60 | | |
| Bonding agent (wt. %) | 25 | 25 | 25 | 20 | 20 | 25 | 20 | 20 | 25 | 20 | 25 | 20 | 20 | 25 | 25 | (Note 1) | (Note 2) |
| Kaolin (wt. %) | 35 | 35 | 35 | 50 | 60 | 35 | 52.5 | 40 | 35 | 50 | 35 | 52.5 | 40 | 35 | 35 | | |
| Alumina particle (wt. %) | — | — | — | — | — | — | 20 | 10 | — | — | — | 20 | 10 | — | — | | |
| $Na_2O$ amount in catalyst (wt. %) | 0.5 | 0.4 | 0.5 | 0.3 | 0.2 | 0.3 | 0.4 | 0.4 | 0.4 | 0.4 | 0.3 | 0.4 | 0.4 | 0.4 | 0.3 | — | 0.4 |
| Component incorporated in catalyst (wt. %) | — | — | — | — | — | — | 1.8 $RE_2O_3$ | — | — | — | — | 1.8 $RE_2O_3$ | — | — | — | — | 1.5 $P_2O_5$ |

(Note 1) Items of porous matrix: Kaolin 16.5 wt. %, alumina 45 wt. %, $P_2O_5$ 8.5 wt. %
(Note 2) Items of porous matrix: Silica 20 wt. %, alumina particle 10 wt. %, Kaolin 40 wt. %

EXAMPLE 2

A catalytic cracking test was carried out using the catalysts shown in Table-2. Prior to the test, each catalyst was calcined at 600° C. for 2 hours, and thereafter contacted with 100% steam at the temperature and time shown in the following table for pre-treatment. Then, each catalyst was again calcined at 600° C. for 1 hour, and thus subjected to the catalyst cracking test.

The reaction conditions employed and the test results obtained in the case where desulfurization vacuum gas oils (DSVGO) were used as feed stock are shown in Table-3.

The relationship between the temperatures used for pre-treatment of the catalyst and the conversion rates of the vacuum gas oil is shown in FIG. 1.

The reaction conditions employed and the test results obtained in the case where desulfurization atomospheric residue (DSAR) were used as feed stock are shown in Table-4.

TABLE 3

| | Evaluation of catalyst | | | | | | | | |
|---|---|---|---|---|---|---|---|---|---|
| | Catalysts of the invention | | | | | | Reference catalysts | | |
| Catalyst No. | B | D-1 | D-2 | E-1 | I | F-1 | F-2 | G-1 | H |
| Pretreating conditions | | | | | | | | | |
| Temperature (°C.) | 750 810 | 750 810 | 750 810 | 750 810 | 750 810 | 750 810 | 750 810 | 750 810 | 750 810 |
| Time (hr) | 17 | 17 | 17 | 17 | 17 | 17 | 17 | 17 | 17 |
| Cracking reaction | | | | | | | | | |

TABLE 3-continued

Evaluation of catalyst

| Catalyst No. | \multicolumn{6}{c}{Catalysts of the invention} | | | | | | | \multicolumn{3}{c}{Reference catalysts} | | |
|---|---|---|---|---|---|---|---|---|---|---|---|---|---|---|---|---|---|---|
| | B | | D-1 | | D-2 | | E-1 | | I | | F-1 | | F-2 | | G-1 | | H | |
| Conditions | | | | | | | | | | | | | | | | | | |
| Reaction temperature (°C.) | 482 | | 482 | | 482 | | 482 | | 482 | | 482 | | 482 | | 482 | | 482 | |
| Space velocity (HR$^{-1}$) | 16 | | 16 | | 16 | | 16 | | 16 | | 16 | | 16 | | 16 | | 16 | |
| Catalyst/oil (wt/wt) | 3 | | 3 | | 3 | | 3 | | 3 | | 3 | | 3 | | 3 | | 3 | |
| Cracking test results | | | | | | | | | | | | | | | | | | |
| Conversion (wt. %) | 70 | 61 | 66 | 57 | 62 | 53 | 71 | 62 | 69 | 59 | 71 | 51 | 65 | 48 | 68 | 55 | 68 | 53 |
| Hydrogen (wt. %) | 0.03 | 0.03 | 0.03 | 0.03 | 0.03 | 0.03 | 0.03 | 0.03 | 0.04 | 0.03 | 0.03 | 0.03 | 0.04 | 0.04 | 0.04 | 0.04 | 0.04 | 0.04 |
| C$_5^+$ gasoline (wt. %) | 50 | 44 | 49 | 47 | 48 | 46 | 51 | 47 | 48 | 44 | 50 | 41 | 46 | 36 | 45 | 44 | 47 | 43 |
| Coke (wt. %) | 1.7 | 0.9 | 1.2 | 0.8 | 0.9 | 0.6 | 1.4 | 0.9 | 1.4 | 1.0 | 1.8 | 0.8 | 1.2 | 0.7 | 1.3 | 1.1 | 1.3 | 1.1 |
| Selectivity | | | | | | | | | | | | | | | | | | |
| (Conversion/hydrogen) × 0.01 | 23 | 20 | 23 | 19 | 21 | 18 | 24 | 21 | 17 | 20 | 24 | 17 | 16 | 12 | 17 | 14 | 17 | 13 |
| Conversion/coke | 41 | 68 | 55 | 71 | 69 | 88 | 51 | 69 | 49 | 59 | 39 | 64 | 54 | 69 | 52 | 50 | 52 | 48 |

(1) C$_5^+$ gasoline: Voiling point range C$_5$ to 216° C.

TABLE 4

Evaluation of catalysts

| Catalyst No. | Catalysts of this invention | | | Reference catalysts | | | | |
|---|---|---|---|---|---|---|---|---|
| | B | E-2 | E-3 | F-1 | G-2 | G-3 | V | W |
| Pretreating conditions | | | | | | | | |
| Temperature (°C.) | 810 | 800 | 800 | 810 | 800 | 800 | 800 | 800 |
| Time (hr) | 17 | 6 | 6 | 17 | 6 | 6 | 6 | 6 |
| Cracking reaction conditions | | | | | | | | |
| Reaction temperature (°C.) | 500 | 500 | 500 | 500 | 500 | 500 | 500 | 500 |
| Space velocity (Hr$^{-1}$) | 16 | 16 | 16 | 16 | 16 | 16 | 16 | 16 |
| Catalyst/oil (wt/wt) | 3 | 3 | 3 | 3 | 3 | 3 | 3 | 3 |
| Cracking test results | | | | | | | | |
| Conversion (wt. %) | 70 | 58 | 66 | 64 | 56 | 65 | 79 | 70 |
| Hydrogen (wt. %) | 0.07 | 0.16 | 0.18 | 0.09 | 0.17 | 0.18 | 0.24 | 0.2 |
| C$_5^+$ gasoline (wt. %) | 48 | 42 | 43 | 44 | 40 | 42 | 46 | 45 |
| Coke (wt. %) | 5.1 | 5.5 | 5.7 | 5.2 | 6.0 | 6.0 | 9.9 | 7.2 |
| Selectivity | | | | | | | | |
| (Conversion/hydrogen) × 0.1 | 100 | 36 | 37 | 71 | 33 | 36 | 33 | 35 |
| Conversion/coke | 14 | 11 | 12 | 12 | 9 | 11 | 8 | 10 |

EXAMPLE 3

A part of each of the catalysts A, B, E-1, C., F-1 and G-1 obtained by Example 1 was calcined at 600° C. for 2 hours in the air, and thereafter impregnated with a benzene solution containing nickel naphthenate and vanadium naphthenate.

Then, the benzene was removed therefrom under a reduced pressure. The catalysts were calcined again to deposit, on each catalyst, nickel and vanadium in predetermined quantities.

The cracking activities of thus obtained respective catalysts were evaluated according to the same manner as Example 2 using DSVGO as feed stock. The obtained results are shown in Table-5.

TABLE 5

Evaluation of catalysts

| Catalyst No. | Catalysts of this invention | | | Reference catalysts | | |
|---|---|---|---|---|---|---|
| | A | B | E-1 | C | F-1 | G-1 |
| Deposited metal quantity | | | | | | |
| Ni (wt. ppm) | 5000 — | 1700 — | 5000 | 5000 — | 1700 — | 5000 |
| V (wt. ppm) | — — | 3300 — | — | — — | 3300 — | — |
| Pretreating conditions | | | | | | |
| Temperature (°C.) | 770 750 | 770 750 | 770 | 770 750 | 770 750 | 770 |
| Time (Hr) | 6 17 | 6 17 | 6 | 6 17 | 6 17 | 6 |
| Cracking reaction conditions | | | | | | |
| Reaction temperature (°C.) | 482 482 | 482 482 | 482 | 482 482 | 482 482 | 482 |
| Space velocity (Hr$^{-1}$) | 16 16 | 16 16 | 16 | 16 16 | 16 16 | 16 |
| Catalyst/oil (wt/wt) | 3 3 | 3 3 | 3 | 3 3 | 3 3 | 3 |
| Cracking test results | | | | | | |
| Conversion (wt. %) | 73 70 | 61 71 | 69 | 68 71 | 52 68 | 62 |

TABLE 5-continued

| | Evaluation of catalysts | | | | | | | | | |
|---|---|---|---|---|---|---|---|---|---|---|
| | Catalysts of this invention | | | | | Reference catalysts | | | | |
| Catalyst No. | A | B | | E-1 | | C | F-1 | | G-1 | |
| Hydrogen (wt. %) | 0.26 | 0.03 | 0.35 | 0.03 | 0.33 | 0.40 | 0.03 | 0.34 | 0.04 | 0.40 |
| $C_5^+$ gasoline (wt. %) | 51 | 50 | 45 | 51 | 48 | 45 | 50 | 43 | 45 | 42 |
| Coke (wt. %) | 2.5 | 1.7 | 1.9 | 1.4 | 2.4 | 2.8 | 1.8 | 1.9 | 1.3 | 2.4 |
| Selectivity | | | | | | | | | | |
| (Conversion/hydrogen) × 0.1 | 28 | 23 | 17 | 24 | 21 | 17 | 24 | 15 | 17 | 16 |
| Conversion/coke | 29 | 41 | 32 | 51 | 29 | 24 | 39 | 27 | 52 | 26 |

As is apparent from the previous showings, the catalytic cracking catalyst composition of the present invention, whose zeolite component (faujasite) contains phosphorus, displays a high cracking activity and produces gasoline in high yield as compared with the same kind of catalysts which contain no phosphorus, irrespective of whether the feed stock is a vacuum gas oil or a atomospheric residue. Referring to the quantities of produced hydrogen and coke, the catalysts of the present invention produce hydrogen and coke in small quantities even though said catalysts display high conversion activity, which is understandable from the values of selectivity shown in Table-3 and Table-4.

Furthermore, the catalysts of the present invention are superior in hydrothermal stability. That is, as is evident from Table-3 and FIG. 1, the catalysts of the present invention are not so conspicuous in the lowering of conversion activity caused by contact with high temperature steam as compared reference catalysts.

This fact shows that the catalysts of the present invention are superior in hydrothermal stability.

Still further, the catalysts of the present invention, as is understandable from the results shown in Table-5, maintain high conversion activity and gasoline selectivity even when heavy metals deposit thereon, and restrain the production of hydrogen and coke to low levels. This fact shows that the catalysts of the present invention are effective for catalytic cracking the low grade heavy hydrocarbon containing relatively large quantities of metallic contaminants.

We claim:

1. A hydrocarbon oil catalytic cracking catalyst composition comprising a particulate mixture of 95 to 50 wt. % of a nonphosphorus-containing porous matrix and 5 to 50 wt. % of a Y faujasite containing phosphorus in an amount of 0.3 to 15 wt. % as $P_2O_5$, the $P_2O_5$ wt. % being based on the weight of the phosphorus-containing Y faujasite, said phosphorus-containing Y faujasite having been prepared by contacting said Y faujasite with a phosphorus-containing compound to incorporate the phosphorus therein and heating the Y faujasite having phosphorus incorporated therein at a temperature of about 400° to 800° C. in a steam atmosphere.

2. The catalyst composition of claim 1, wherein said phosphorus-containing Y faujasite is prepared by treating a Y faujasite with a phosphoric ion-containing aqueous solution.

3. The catalyst composition as claimed in claim 2, wherein said phosphoric ion-containing aqueous solution further contains an ammonium ion.

4. The catalyst composition as claimed in claim 1, wherein said phosphorus-containing a faujasite is prepared by being calcined at a temperature of about 400° to 800° C. in a steam atmosphere.

5. The catalyst composition as claimed in claim 1, wherein said Y faujasite contains an alkali in a quantity of 3.0 wt. % or less as $Na_2O$.

6. The catalyst composition of claim 1, wherein said phosphorous-containing Y faujasite is selected from the group consisting of phosphorus-containing NaY faujasite, phosphorus-containing RE—Y faujasite, phosphorus-containing $NH_4$—Y faujasite and H—Y faujasite, where RE stands for rare earth elements.

7. A hydrocarbon oil catalytic cracking catalyst composition consisting essentially of a particulate mixture of 60 wt. % of a nonphosphorus-containing porous matrix consisting of 42 wt. % of a silica hydrosol bonding agent and 58 wt. % of kaolin, the wt. % of said bonding agent and said kaolin being based on the total weight of the porous matrix, and 40 wt. % of a phosphorus-containing H—Y faujasite which contains 5.1 wt. % phosphorus as $P_2O_5$, the $P_2O_5$ wt. % being based on the weight of the phosphorus-containing H—Y faujasite, said phosphorus-containing H—Y faujasite having been prepared by contacting said H—Y faujasite with a phosphorus-containing compound to incorporate the phosphorus therein and heating the H—Y faujasite having phosphorus incorporated therein at a temperature of about 400° to 800° C. in a steam atmosphere.

8. A hydrocarbon oil catalytic cracking catalyst composition consisting essentially of a particulate mixture of 70 wt. % of a nonphosphorus-containing porous matrix consisting of 29 wt. % of a silica hydrosol bonding agent, 57 wt. % of kaolin and 14 wt. % of alumina, the wt. % of said bonding agent, said kaolin and said alumina being based on the total weight of the porous matrix, and 30 wt. % of a phosphorus-containing H—Y faujasite which contains 5.1 wt. % phosphorus as $P_2O_5$, the $P_2O_5$ wt. % being based on the weight of the phosphorus-containing H—Y faujasite, said phosphorus-containing H—Y faujasite having been prepared by contacting said H—Y faujasite with a phosphorus-containing compound to incorporate the phosphorus therein and heating the H—Y faujasite having phosphorus incorporated therein at a temperature of about 400° to 800° C. in a steam atmosphere.

9. A hydrocarbon oil catalytic cracking catalyst composition comprising a particulate mixture of 95 to 50 wt. % of a nonphosphorus-containing porous matrix and 5 to 50 wt. % of a Y faujasite which is not ultrastable but does contain phosphorus in an amount of 0.3 to 15 wt. % as $P_2O_5$, the $P_2O_5$ wt. % being based on the weight of the phosphorous-containing Y faujasite.

* * * * *

UNITED STATES PATENT AND TRADEMARK OFFICE
CERTIFICATE OF CORRECTION

PATENT NO. : 4 970 183

DATED : November 13, 1990

INVENTOR(S) : Hiromi NAKAMOTO et al

It is certified that error appears in the above-identified patent and that said Letters Patent is hereby corrected as shown below:

Column 9, line 64; change "a" to ---Y---.

Signed and Sealed this

Third Day of November, 1992

*Attest:*

DOUGLAS B. COMER

*Attesting Officer*   *Acting Commissioner of Patents and Trademarks*